United States Patent [19]

Kangas

[11] 4,102,548
[45] Jul. 25, 1978

[54] INFINITELY VARIABLE, CONTROLLABLY AND/OR AUTOMATICALLY ADJUSTABLE AIR DEFLECTOR AND METHOD

[75] Inventor: Timothy J. Kangas, Renton, Wash.

[73] Assignee: Paccar Inc., Bellevue, Wash.

[21] Appl. No.: 747,728

[22] Filed: Dec. 6, 1976

[51] Int. Cl.² .............................................. B62D 35/00
[52] U.S. Cl. .................................... 296/1 S; 105/2 R; 180/1 FV
[58] Field of Search ................... 296/1 S, 91; 105/2 R; 180/1 FV; 244/203

[56] References Cited

U.S. PATENT DOCUMENTS

| | | | |
|---|---|---|---|
| 2,036,560 | 4/1936 | Backus | 296/1 S |
| 2,851,644 | 9/1958 | Ferguson | 244/203 |
| 2,932,370 | 4/1960 | Kraus | 296/1 S |
| 3,455,594 | 7/1969 | Hall | 296/1 S |
| 3,721,198 | 3/1973 | Applegate | 180/1 FV |
| 3,794,372 | 2/1974 | Webb | 296/1 S |
| 3,834,752 | 9/1974 | Cook | 105/2 R |
| 3,951,445 | 4/1976 | Tatom | 296/1 S |

*Primary Examiner*—Joseph F. Peters, Jr.
*Assistant Examiner*—John A. Carroll
*Attorney, Agent, or Firm*—Seed, Berry, Vernon & Baynham

[57] ABSTRACT

A method and apparatus whereby an operator within the cab of an automotive vehicle can manually or automatically deflect oncoming and side air flows to obtain the optimum air drag reduction on the vehicle.

14 Claims, 7 Drawing Figures

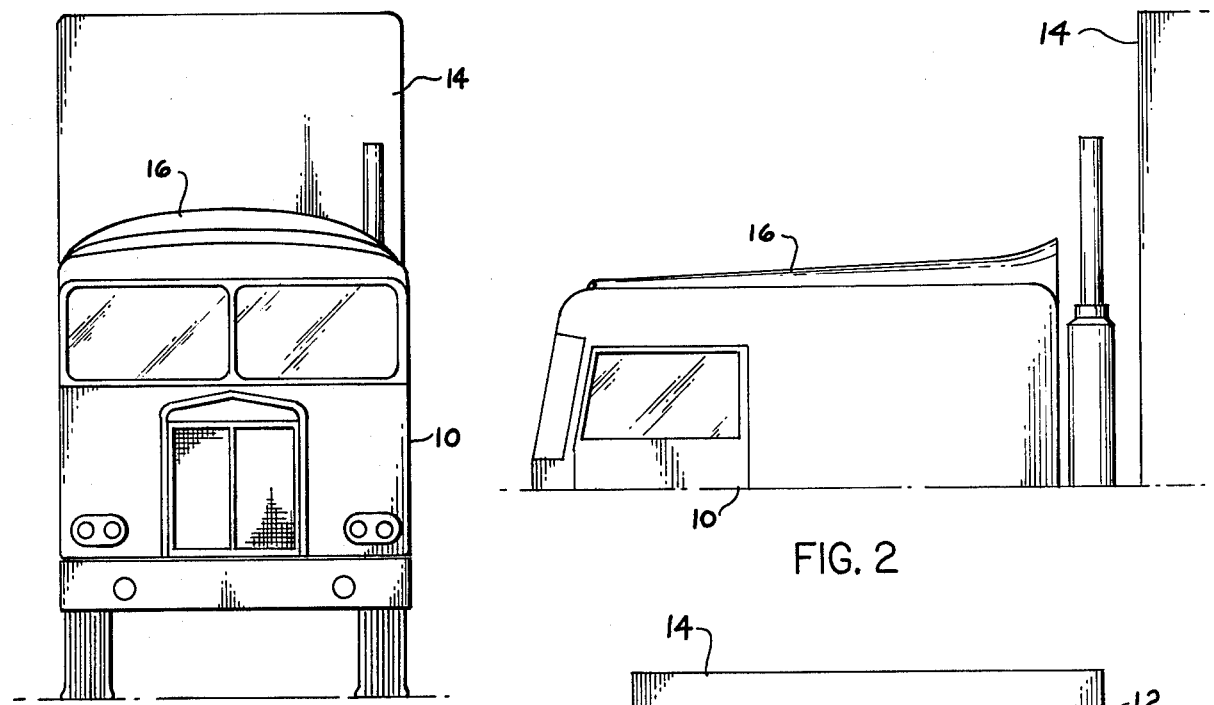
FIG. 1
FIG. 2
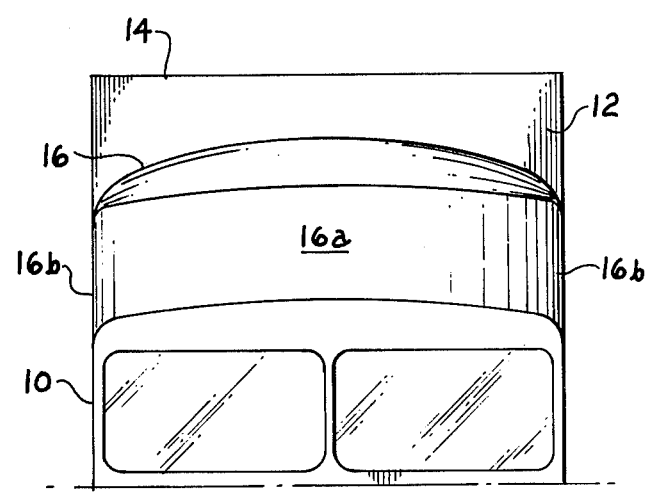
FIG. 3
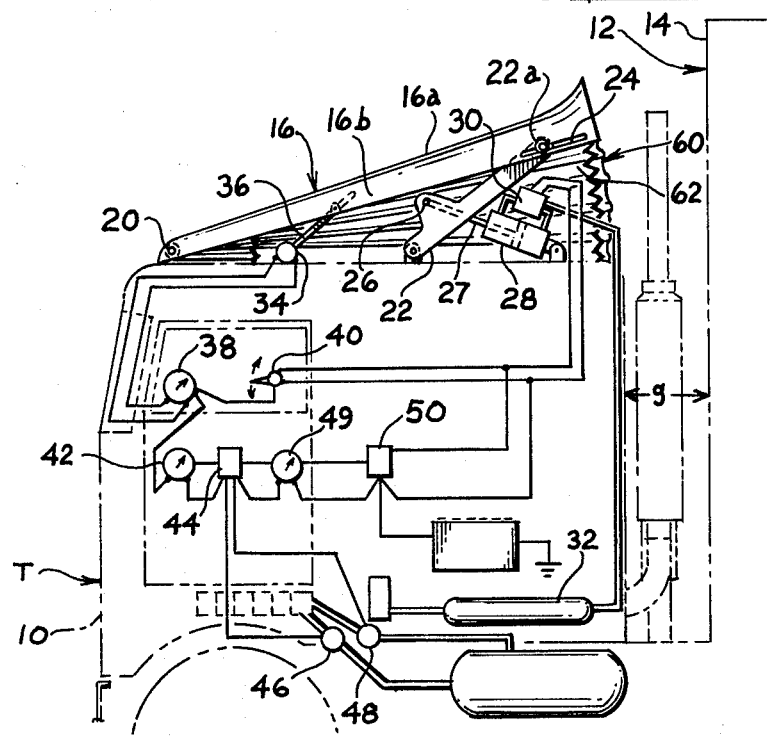
FIG. 4

4,102,548

INFINITELY VARIABLE, CONTROLLABLY AND/OR AUTOMATICALLY ADJUSTABLE AIR DEFLECTOR AND METHOD

BACKGROUND OF THE INVENTION

1. Field of the Invention

This invention pertains to air deflectors and methods for reducing air drag on tractor-trailer vehicles caused by oncoming and laterally directed air flows.

2. Description of the Prior Art

Aerodynamic drag on heavy trucks is becoming of increasing concern. As a result, numerous devices for reducing the aerodynamic drag on the rear container (usually a cargo container) of the vehicle have been proposed. Currently available devices are specifically designed and installed to perform properly for a particular tractor-trailer. Some fixed devices can be coarsely adjusted by changing bolt/bracket patterns when the vehicle is at rest. If a different trailer is attached to the tractor without an accurate adjustment efficient drag reduction may be affected and in some cases drag may even be increased over that occurring if no drag-reducing device were added. An extreme example is one trailer being higher than the tractor and spaced close to the tractor as opposed to a second trailer which is lower than the tractor or spaced a large distance from it.

SUMMARY OF THE INVENTION

It is an object of this invention to provide an adjustable air deflector movable between an active deflecting position and an inactive stowed position.

It is another object of this invention to provide a remotely manual or automatically controlled air deflector on an automotive vehicle for deflecting oncoming air to reduce aerodynamic drag on the vehicle.

It is another object of this invention to provide a method for manually and/or automatically creating the optimum drag reduction from oncoming air around a tractor-trailer.

Basically, the apparatus objects of this invention are obtained by providing on a tractor a deflector which is movable between an active, extended position and an inactive, stowed position in which its contours allow it to lie generally flat over the top of the tractor. The deflector can be added to the roof of the tractor or be the roof of the tractor. In the preferred embodiment the position of the deflector at any particular time is optimized by sensing vehicle performance at different positions of the deflector. The vehicle performance sensed then can be used to automatically reposition the deflector to obtain maximum performance or can be manually adjusted by the operator of the vehicle to maintain maximum performance. In either case, the adjustment can be made at any time while the vehicle is moving during actual driving conditions, or at rest.

In the method of the invention, the air is either caused to be deflected or allowed to pass over the tractor depending upon the nature of the trailer. The amount of deflection is controlled either automatically or manually from within the cab by again sensing the performance of the vehicle under various amounts of deflection.

As is readily apparent, the apparatus and method provide for infinite variation in the deflector and thus the amount of deflection so that it can be optimized regardless of the configuration of the vehicle. Since studies have indicated that at highway speeds a tractor-trailer combination can use half of its fuel to overcome aerodynamic drag, it can be readily seen that optimizing the vehicle performance by infinitely adjustable deflection will provide substantial savings in fuel costs. Infinite adjustment provides the best performance regardless of the shape of the deflector and the shape and spacing of the tractor-trailer configuration. As is understood reduction in drag on the trailer occurs but in addition the deflector reduces drag forward of the deflector by streamlining otherwise turbulent air flow along the tractor.

BRIEF DESCRIPTION OF THE FIGURES OF THE DRAWING

FIG. 1 is a front elevation of an automotive vehicle illustrating the principles of the invention.

FIG. 2 is a fragmentary side elevation of an automotive vehicle illustrating a deflector in a stowed position.

FIG. 3 is a fragmentary front elevation of the vehicle shown in FIG. 1 with the deflector in an elevated position.

FIG. 4 is a side elevation of the vehicle shown in FIG. 1 with a deflector in an elevated position and showing schematically the controls for manually or automatically maintaining the deflector in an optimum position.

DETAILED DESCRIPTION OF THE PREFERRED EMBODIMENTS

Figure 5:
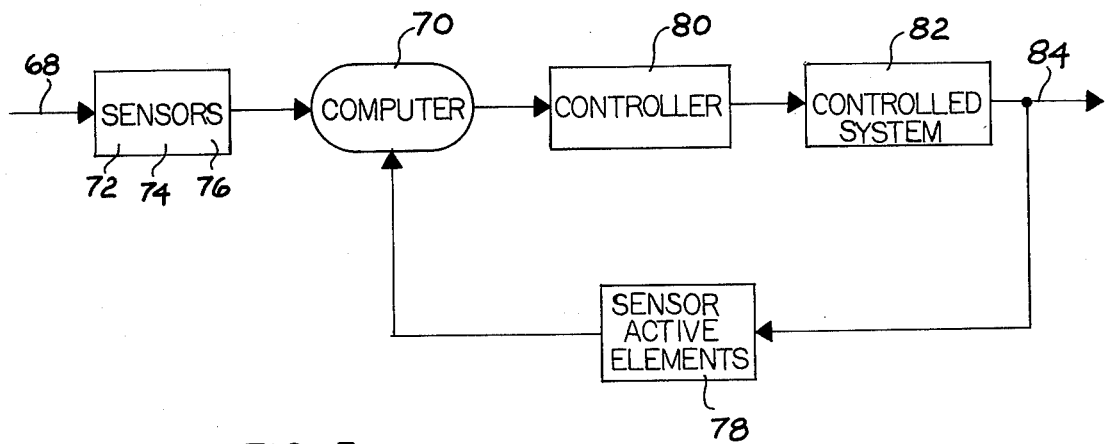
FIG. 5 is a functional schematic of a control circuit for automatically controlling the position of the deflector.

As best shown in FIG. 4, a tractor T has a cab 10 (which can include a sleeper compartment) forward of a cargo container or trailer 12. In a tractor-trailer unit, there is generally a space or gap g between the rear of the cab and the forward end of the trailer which is a source of aerodynamic drag. In addition the forward surface 14 of the cargo or cargo container is a very substantial source of aerodynamic drag.

Mounted on the top of the tractor is a deflector 16. The deflector has a central portion 16a which smoothly curves upwardly and rearwardly. The deflector also has opposite side portions 16b which curve laterally and downwardly to generally fair or conform to the top surface of the cab. Thus in the downward, inactive position of the deflector, as best shown in FIGS. 1 and 2, the deflector offers little resistance to air movement beyond that which is already caused by the cab.

The deflector 16 is mounted by a pivot 20 to the forward end of the top of the cab 10. A pair of links 22 on opposite sides of the cab are connected at their remote ends by rods 22a that ride in a pair of slots 24 in the side portions of the deflector. The links are joined by a cross shaft 26 that is connected to the piston rods 27 of spaced actuating cylinders 28. A conventional shock absorber 29 may be coupled to the cross shaft 26 to reduce oscillations and vibration. A conventional solenoid operated valve 30 is coupled to the vehicle air compressor and storage tanks 32 so that energization of the valve 30 will extend or retract the links 22 and thus the deflector. A potentiometer 34 is also connected to the deflector through a link 36 to measure the exact position of the deflector at any particular time.

Figure 6:
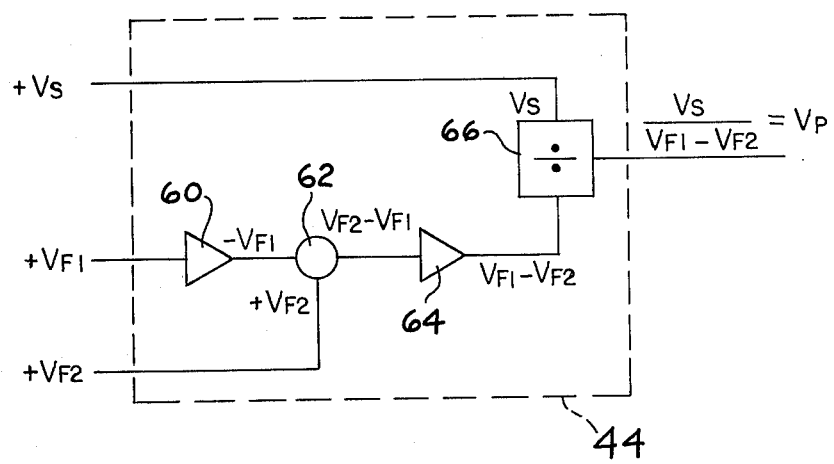
FIG. 6 is an electrical schematic illustrating one operative circuit for providing an automatic and/or manually adjusted deflector position from within the cab.
Figure 7:
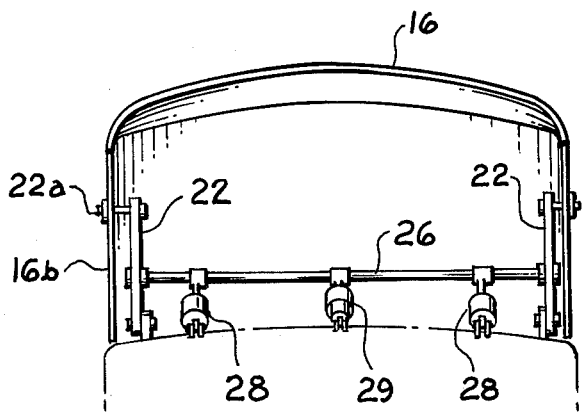
FIG. 7 is a rear view of the deflector and operating apparatus shown in FIG. 4.

It is an important aspect of this invention that the energization of valve 30 and thus the position of the deflector 16 can be automatically or selectively manually controlled by the operator of the vehicle. For this purpose, the potentiometer 34 is connected to a visual deflector position indicator 38 which may be an appropriately calibrated voltmeter. A two-position switch 40 is connected to the battery and to the solenoid valve 30 for positioning the valve. A speed signal Vs from the speedometer 42 is fed to an analog comparator 44 illustrated in greater detail in FIG. 6. The comparator 44 also receives fuel consumption information obtained by comparing a fuel flow signal $V_{F1}$ from the fuel input flow meter 46 with a fuel return signal $V_{F2}$ from the fuel-return-tank flow meter 48. The fuel flow signal $V_{F1}$ is inverted by a conventional analog inverter 60 and summed with the fuel return signal $V_{F2}$ by conventional analog adder 62. The output of the adder 62 is inverted by an analog inverter 64 to produce a fuel consumption signal $V_{F1}-V_{F2}$. The fuel consumption signal $V_{F1}-V_{F2}$ is thus an indication of the energy being consumed to propel the vehicle. The speed signal Vs is divided by the fuel consumption signal $V_{F1}-V_{F2}$ in a conventional analog divider 66 to generate a performance signal Vp. Since the speed signal Vs is an indication of the useful power being generated, the ratio of the speed signal Vs to the fuel comsumption signal $V_{F1}-V_{F2}$ is a measure of the efficiency at which fuel is being utilized. Therefore, minimizing vehicle air resistance or drag by optimizing the position of the deflector 16 maximizes the performance signal Vp. The value of the performance signal Vp is continuously displayed on a performance meter 49 which may be an appropriately calibrated voltmeter. For manual operation the vehicle operator will merely move the switch 40 to position the deflector up or down until the optimum performance reading is obtained on the output 49. Another alternative is to maintain a constant throttle position for a period of time, on a level road, while manually adjusting switch 40 to obtain the maximum speedometer reading.

As an alternative to manual adjustments of the deflector based on visual observation of the speedometer or output dial 49, the optimum setting can also be obtained automatically. In one embodiment this is accomplished by producing an electrical output from the output dial 49 and passing the output to a conventional feedback circuit 50 which automatically adjusts the position of the valve 30 until the optimum performance is reached at particular speed and driving conditions. The problem is simply a matter of maximizing the valve of the performance signal Vp. Although other techniques will be apparent, one technique for performing this function is to oscillate or dither the position of the deflector 16 about an average position and examine the resulting variations in the performance signal Vp. If the value of the performance signal Vp increases for higher positions of the deflector, i.e. the performance signal Vp is in phase with the position signal from the potentiometer 34, the average position of the deflector 16 is increased. Conversely if the performance signal Vp is opposite in phase with the position signal from the potentiometer 34 the average position of the deflector 16 is decreased. The feedback circuit 50 can easily be implemented with convention circuit techniques such as, for example, by a conventional analog comparator and oscillator which receives the performance signal Vp and the position signal from the potentiometer 34 and generates a position command signal.

A more sophisticated system which is capable of responding to external parameters 68 such as grade angle, wind speed and direction and load weight is illustrated in FIG. 5. A computer 70, which is preferably an appropriately programmed microprocessor system, such as an Intel 8080 microcomputer system, receives signals indicative of various conditions and external parameters 68 from sensors 72,74,76. The computer 70 also receives a signal from another sensor 78 which indicates the actual performance of the vehicle. The computer 70 then calculates an error signal which is an indication of the deflector's deviation from optimum position. The error signal is applied to a deflector control circuit 80 which changes the performance of the controlled system or vehicle 82 so that a new set of vehicle parameters 84 such as speed, fuel consumption, etc., are produced. The system thus optimizes the position of the deflector 16.

As is readily apparent, both the manual and the automatic adjustments are made while the vehicle is in an actual driving situation and is not dependent upon the particular type of cargo container behind the cab. That is, if the vehicle is a tractor pulling a very low, flatbed-type trailer, the deflector will remain in its stowed, inactive position since this will produce the highest performance of the vehicle. If the cargo container is an extremely high trailer, however, the deflector will become raised until it reduces oncoming air flow acting against the container to produce the highest performance reading and thus lowest aerodynamic drag for that particular speed.

Still a third alternative, which is less satisfactory but also less expensive, is to merely provide a chart next to the deflector position indicator 38 indicating from previous tests the generally optimum deflector setting for various types of trailer rigs. While optimum reduction of drag is not possible with such a system because of variations between the gap g and wind conditions an approximate optimization is obtained which is far better than that obtained from fixed deflector units.

In order to reduce aerodynamic drag caused by wind blowing transversely across the top of the cab, the deflector is provided with collapsible side curtains 60. While various types of collapsible side curtains are available, one preferred embodiment is the use of accordian folded rigid panels 62 folded much as in oriental fans.

As is readily apparent, the adjustment of the deflector serves the useful purpose of forcing the free oncoming stream air smoothly over and around the cargo container thus reducing the drag and hence the fuel used by the vehicle. With the use of the side members, aerodynamic drag caused by cross-over flow of air streams is also reduced. While the preferred embodiments of the invention have been illustrated and described, it should be understood that variations such as electro-mechanical or hydraulic actuators rather than air cylinders will be apparent to one skilled in the art without departing from the principles herein. Furthermore while the invention is most advantageously used for tractor-trailer applications it also may be used for single chassis truckes with a fixed cab and cargo container. Improvement in performance is obtained for such trucks during varying wind conditions and the deflector may be retracted for braking purposes on long down grades.

Accordingly, the invention is not to be limited to the specific embodiment illustrated in the drawing.

The embodiments of the invention in which a particular property or privilege is claimed are defined as follows:

1. A device for reducing aerodynamic drag on an automotive vehicle having a cab forward of a cargo compartment comprising:

air deflecting means mounted on the top of the cab and movable between a lower position closer to the top of the cab and in which air deflection is of one amount, and a higher position in which air is deflected in a greater amount from the top of the cab, means for moving the air deflecting means, and control means within the cab for actuating the moving means to vary the location of the deflecting means through various amounts of deflection between said lower and higher positions while the vehicle is traveling such that the air deflecting means may be placed into an optimum reduced drag position.

2. The device of claim 1, wherein said vehicle is a tractor having a rearward replaceable trailer of variable size and distance from the tractor.

3. The device of claim 2, said air deflecting means including collapsible sidewalls for deflecting cross air flow.

4. The device of claim 2, said control means including visual output means within the tractor for indicating optimum drag reduction.

5. The device of claim 2, said control means including output means for producing a signal indicative of an optimum drag reduction, and means coupled to said output means for energizing the moving means automatically in response to variations in said signals indicative of said optimum drag reduction.

6. The device of claim 5, wherein said output means also produces a visual signal indicative of optimum drag reduction.

7. The device of claim 4, said output means including means for comparing speed and fuel consumption.

8. The device of claim 5, said output means including means for comparing speed and fuel consumption.

9. An aerodynamic main deflector for use on top of an automotive vehicle of the type having a rearward cargo container comprising:

a smoothly contoured deflector having a rearwardly and upwardly curved central portion and downwardly curved side portions which generally conform to the shape of the vehicle top for lying thereto when lowered, means operable from within the vehicle for raising and lowering the deflector through a lower position closer to the top of the vehicle and in which air deflection is of one amount, and a higher position in which air is deflected in a greater amount from the top of the vehicle to vary the location of the deflector through various amounts of deflection between said lower and higher positions while the vehicle is traveling such that the air deflector may be placed into an optimum reduced drag position, and collapsible side deflectors positioned adjacent said side portions for closing the gap between the main deflector and the vehicle top when the deflector is raised.

10. The method of reducing aerodynamic drag on a tractor-trailer, comprising:

deflecting oncoming air upwardly over the trailer as the vehicle is moving forwardly, sensing the change in performance of the vehicle due to a reduction in aerodynamic drag, and varying the angle of the deflection through a range of angles in response to said performance change until an optimum reduction in aerodynamic drag is reached.

11. The method of claim 10, said step of sensing the change in performance including visually observing the change and manually varying the deflection.

12. The method of claim 10, said step of sensing the change in performance including generating an output proportional to the vehicle performance and including the step of automatically varying the deflection to produce the optimum performance output.

13. The method of claim 10, including the step of simultaneously blocking air coming from the side of the vehicle to prevent movement of at least part of the side air beneath the path of the oncoming upwardly deflected air.

14. The method of claim 10, wherein the angle of said deflection is continuously varied through an infinite number of angles within said range.

* * * * *